(12) United States Patent                (10) Patent No.:     US 8,034,285 B2
     Canner                              (45) Date of Patent:      Oct. 11, 2011

(54) QUENCHING METHODS AND APPARATUS

(75) Inventor: James B. Canner, Royal Oak, MI (US)

(73) Assignee: Sterling Engineering and Manufacturing Company, Inc., Royal Oak, MI (US)

( * ) Notice: Subject to any disclaimer, the term of this patent is extended or adjusted under 35 U.S.C. 154(b) by 954 days.

(21) Appl. No.: 11/940,657

(22) Filed: Nov. 15, 2007

(65) Prior Publication Data

US 2009/0126835 A1    May 21, 2009

(51) Int. Cl.
    *C21D 1/62*    (2006.01)
(52) U.S. Cl. ......... 266/259; 266/117; 148/647; 148/646
(58) Field of Classification Search ............... 266/259, 266/44, 117, 118, 249; 148/646, 660, 661
    See application file for complete search history.

(56) References Cited

U.S. PATENT DOCUMENTS

| 3,007,823 | A | * | 11/1961 | Adair et al. ................. 148/586 |
| 4,126,492 | A |   | 11/1978 | Okunishi et al. |
| 4,356,717 | A | * | 11/1982 | Okunishi et al. ............ 72/342.3 |
| 4,360,189 | A |   | 11/1982 | Duncan |
| 4,523,748 | A |   | 6/1985  | Latter |
| 4,592,537 | A |   | 6/1986  | Pfaffmann et al. |
| 4,844,427 | A |   | 7/1989  | Pedersen |
| 5,044,611 | A | * | 9/1991  | Beney et al. .................. 266/105 |
| 5,401,006 | A | * | 3/1995  | Canner ......................... 266/117 |
| 5,435,686 | A |   | 7/1995  | Canner |
| 5,492,308 | A | * | 2/1996  | Yao et al. ..................... 266/117 |
| 6,048,418 | A |   | 4/2000  | Canner |
| 6,585,834 | B1 |  | 7/2003  | Kapaan et al. |

FOREIGN PATENT DOCUMENTS

WO    2009/065113 A2    5/2009

OTHER PUBLICATIONS

Marshall, Larry and Canner, Jim; Automated Hardening and Press Quenching of Bearing Races Without Distortion; Industrial Heating (brochure) Jun. 1994.
International Search Report of PCT/US2008/083756 mailed Jul. 2, 2009.

* cited by examiner

*Primary Examiner* — Scott Kastler
*Assistant Examiner* — Michael Aboagye
(74) *Attorney, Agent, or Firm* — Reising Ethington P.C.

(57) ABSTRACT

One or more of the following quenching methods and apparatus: a quenching press for quenching a steel ring, a method of quenching a steel ring, a corresponding set of quenching dies for quenching steel rings, a die handling tool and related method to lift the corresponding set of quenching dies, and a die handling apparatus to load and unload dies to a quenching press.

16 Claims, 13 Drawing Sheets

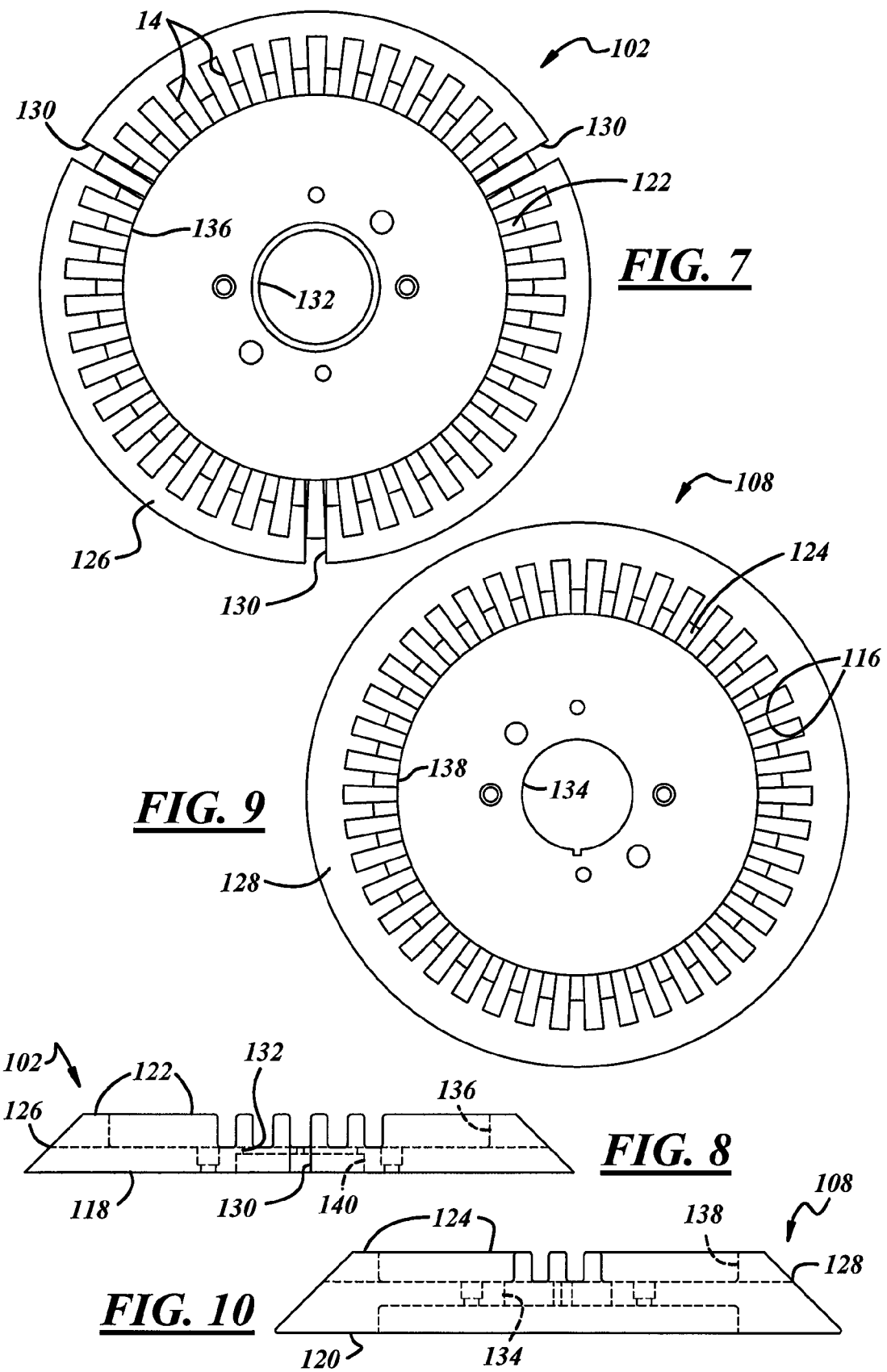

QUENCHING METHODS AND APPARATUS

FIELD OF THE INVENTION

The present invention relates generally to quenching of ferrous workpieces, and more particularly to improved quenching methods and apparatus.

BACKGROUND OF THE INVENTION

Steel rings, such as bearing races, are often heat treated to achieve desirable material characteristics. For example, a bearing race may be heated to very high temperatures to create an austenitic microstructure in the race and then may be rapidly quenched and cooled with a liquid to create a martensitic microstructure for desired hardness. After quenching, the martensitic race may be undesirably brittle and, thus, may be tempered at medium temperatures to toughen the race.

But rapid quenching of a steel ring, especially a thin-walled bearing race, may distort the race to an unacceptable degree. The distorted race then must be ground to final size and shape to a significant degree using expensive and time consuming grinding machines and operations. Accordingly, various methods have been developed to minimize distortion of steel rings during quenching operations to minimize downstream grinding operations. While many of these methods are adequate, there is much room for improvement in control of workpiece roundness and flatness, machine productivity, and process flexibility.

SUMMARY OF THE INVENTION

A quenching press for quenching a steel ring according to one implementation includes a first platen, a first die carried by the first platen, a second platen spaced from the first platen, and a second die carried by the second platen. Also, a quenching ring apparatus is carried by the second platen, and a third platen is spaced from the first platen such that the second platen is interposed between the first and third platens. Further, a ram apparatus is carried by the third platen and is operatively connected to the second platen to move the second platen toward the first platen to clamp the steel ring between the first and second dies, and includes an integrated load cell to sense clamping force applied to the steel ring within a first predetermined range. Moreover, a second load cell is operatively coupled between the ram apparatus and the second platen to sense clamping force applied to the steel ring within a second predetermined range. Finally, a controller is in communication with the ram apparatus including the integrated load cell, and the second load cell and is adapted to adjust the ram apparatus in response to sensed clamping force to apply a substantially uniform clamping force on the steel ring, and to readjust the ram apparatus in response to the sensed clamping force to maintain the substantially uniform clamping force on the steel ring despite contraction in size of the steel ring when the steel ring is exposed to a quenching fluid by the quenching ring apparatus.

In another embodiment, the press may also include a drip guard apparatus including an actuator and a drip guard movable by the actuator between the first and third platens.

A method of quenching a steel ring according to one implementation includes placing a steel ring between a first die carried by a first platen and a second die carried by a second platen, and providing a ram apparatus carried by a third platen and operatively connected to the second platen. The method also includes advancing the ram apparatus to move the second platen toward the first platen to clamp the steel ring between the first and second dies, sensing clamping force applied to the steel ring, and adjusting the ram apparatus in response to the sensed clamping force to apply a substantially uniform clamping force on the steel ring. The method further includes exposing the steel ring to a quenching fluid wherein the steel ring contracts in size, and readjusting the ram apparatus in response to the sensed clamping force to maintain the substantially uniform clamping force on the steel ring.

A corresponding set of quenching dies for quenching steel rings according to one implementation includes a first generally frusto-conical quenching die including a first plurality of teeth, and a second generally frusto-conical quenching die including a second plurality of teeth interdigitatable with the first plurality of teeth of the first generally frusto-conical quenching die.

A die handling tool and related method for lifting a corresponding set of interdigitated quenching dies according to one implementation includes a mandrel including a shank, a first end, an enlarged second end opposite the first end, and a tapered surface between the enlarged second end and the shank. The tool also includes a collet carried on the mandrel and including a handle, a shank extending from the handle, and a tapered end extending from the shank and having an inner tapered surface corresponding to the tapered surface of the mandrel. The mandrel is axially movable relative to the collet to outwardly flare the tapered end of the collet by virtue of the cooperating tapered surfaces of the collet and mandrel, so that the tapered end of the collet is adapted to grip the set of interdigitated quenching dies to lift the dies.

A die handling apparatus to load and unload dies to a quenching press according to one implementation includes a cart, a push-pull device carried on the cart, and an end effector advanced and retracted by the push-pull device. The end effector includes a base plate coupled to the push-pull device, lock pins carried by the base plate, and a lock pin actuating plate movably carried on the lock pins and adapted to actuate the lock pins when the base plate is advanced against the lock pin actuating plate. The end effector also includes posts including heads, and shafts coupled to the lock pin actuating plate and extending through the base plate, and latches movably carried by the base plate and adapted to be positioned between the base plate and the heads of the posts when the base plate is advanced against the lock pin actuating plate.

At least some of the objects, features and advantages that may be achieved by at least certain embodiments of the invention include providing quenching methods and apparatus that enables more uniform quenching of an annular workpiece, significantly reduces workpiece distortion during quenching, fixtures the workpiece with a minimum of heat transfer from the workpiece to reduce distortion during quenching, significantly reduces labor to make a quenched workpiece, and is of relatively simple design, economical manufacture and assembly, rugged, durable, reliable, and in service has a long useful life.

Of course, these and other objects, features and advantages will be apparent in view of this disclosure to those skilled in the art. Various other methods and apparatus embodying the invention may achieve more or less than the noted objects, features or advantages.

BRIEF DESCRIPTION OF THE DRAWINGS

These and other objects, features and advantages of the present invention will be apparent from the following detailed description of preferred embodiments and best mode, appended claims, and accompanying drawings in which:

FIG. 7 is a top view of the lower die of FIG. 1;

FIG. 8 is a side view of the lower die of FIG. 1;

FIG. 9 is a top view of the upper die of FIG. 1;

FIG. 10 is a side view of the upper die of FIG. 1;

FIG. 18 is a fragmentary top view of a portion of the end effector of the die handling apparatus of FIG. 13 as coupled to the lower mounting plate of FIG. 8;

DETAILED DESCRIPTION OF PREFERRED EMBODIMENTS

Figure 1:
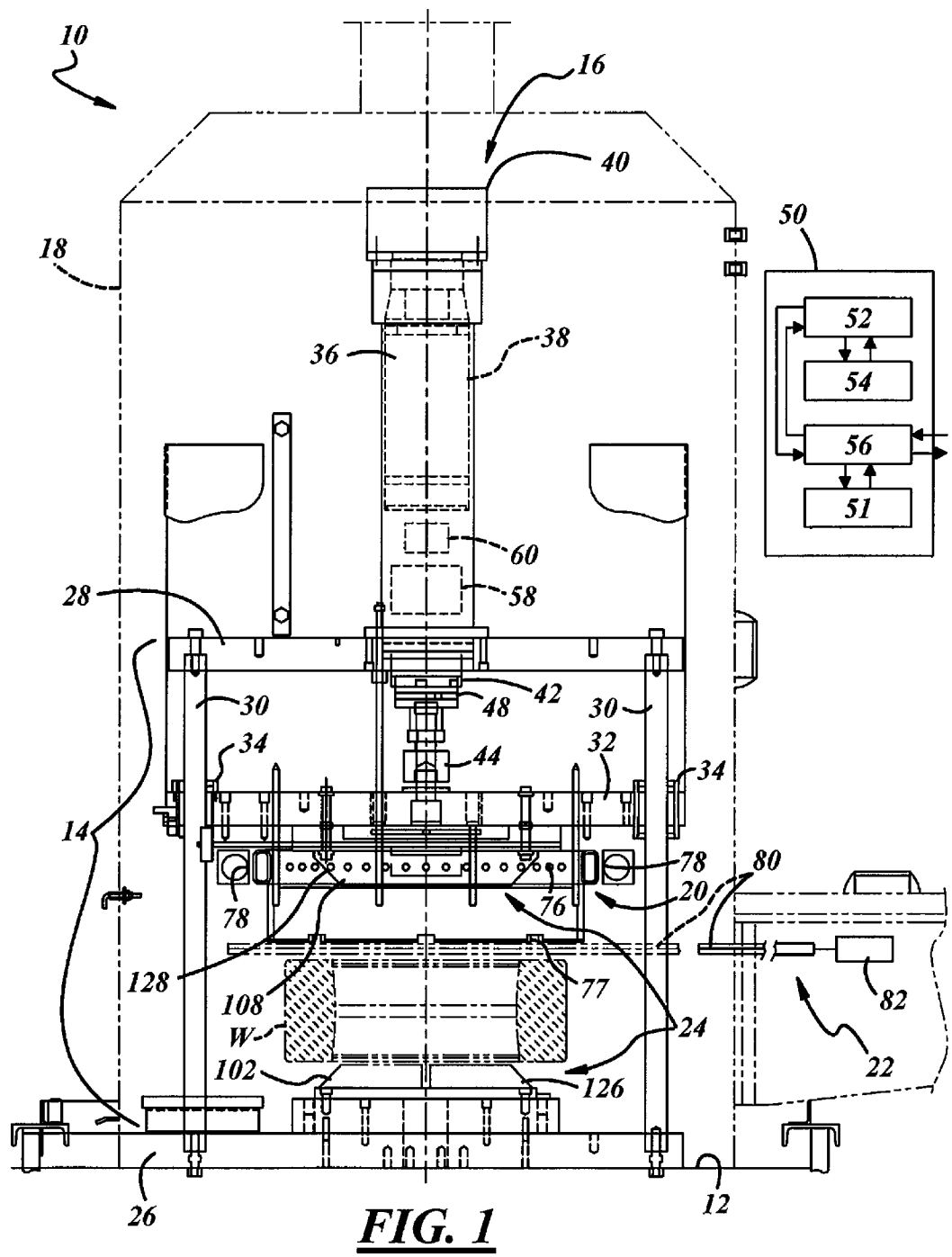
FIG. 1 is a front elevational view of a presently preferred form of a quenching press, including lower and upper dies.
Figure 2:
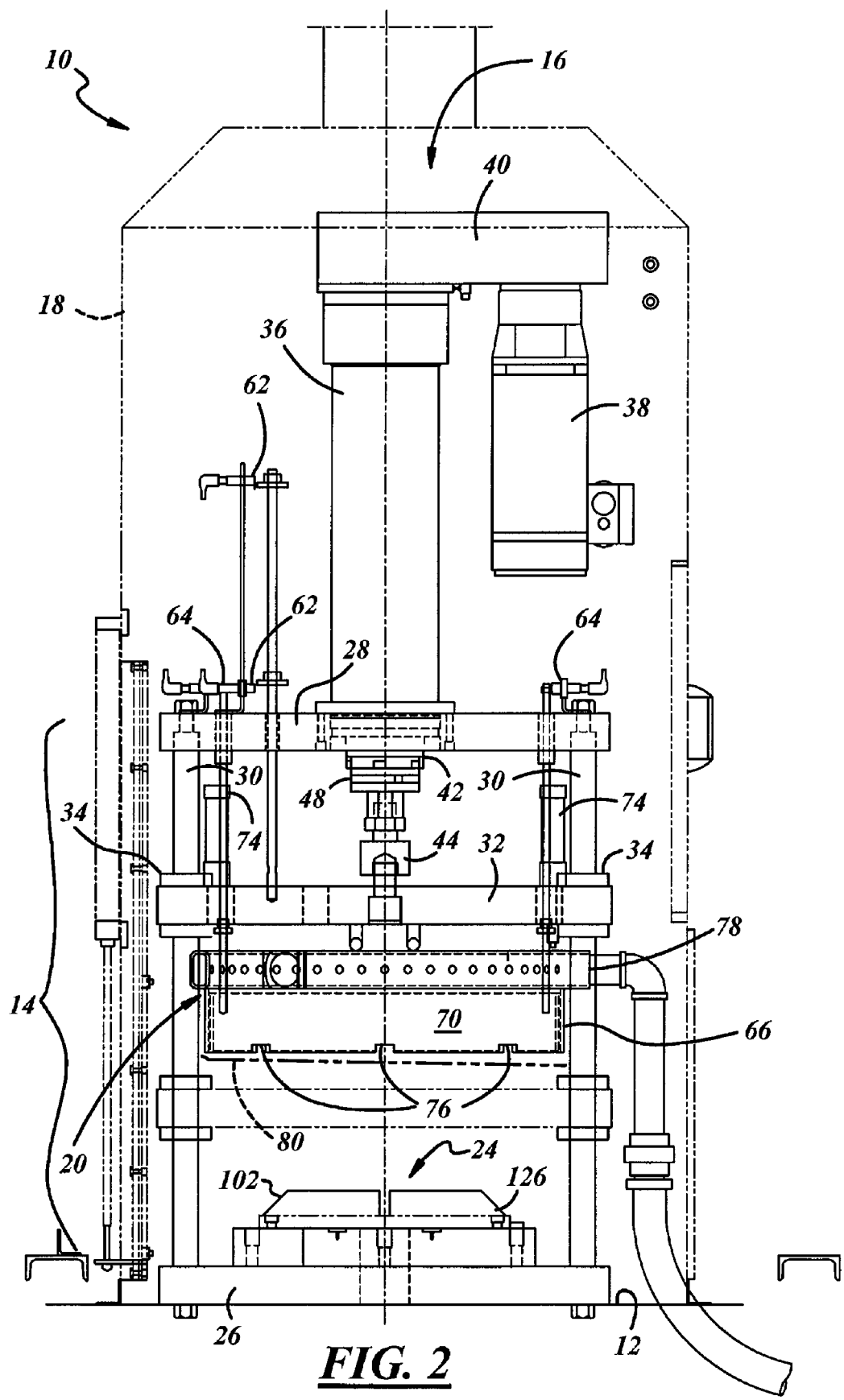
FIG. 2 is a side elevational view of the quenching press of FIG. 1.
Figure 16:
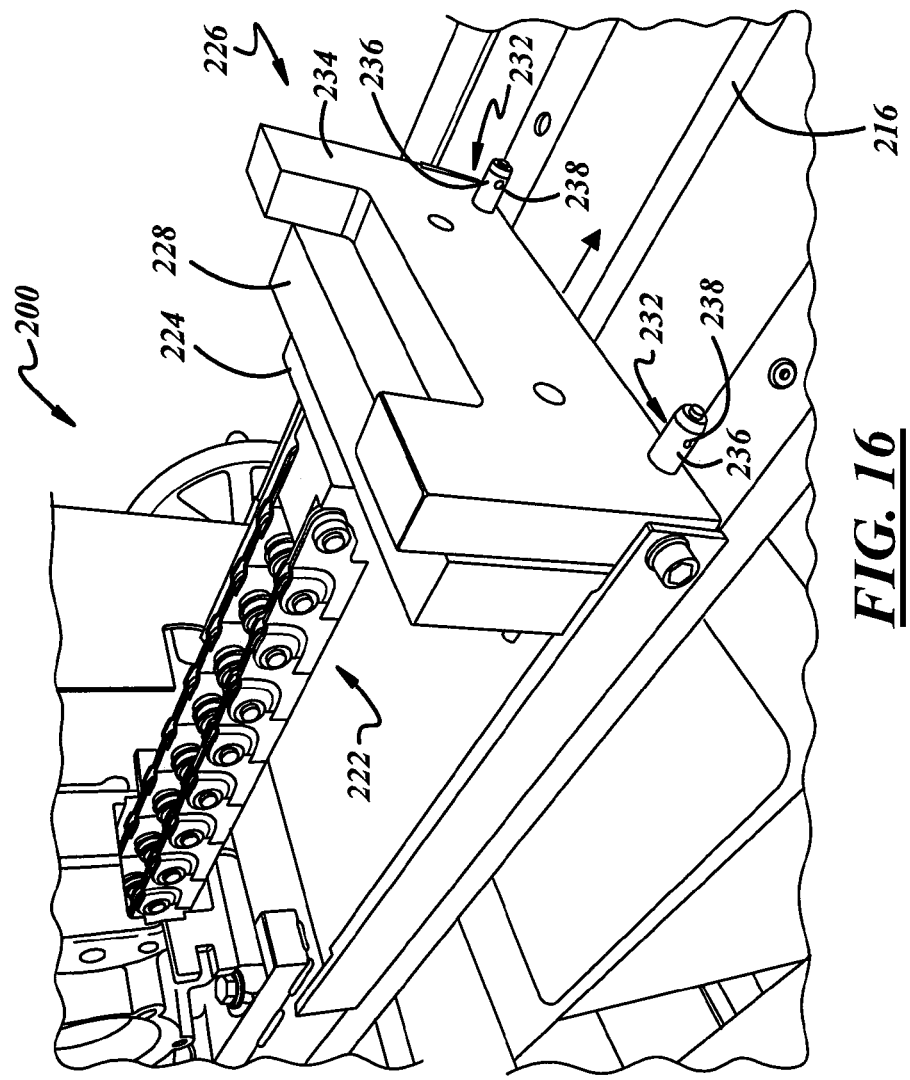
FIG. 16 is a fragmentary front perspective view of a portion of the die handling apparatus of FIG. 13, illustrating a push-pull chain coupled to an end effector.

Referring more specifically now to the drawings, there is illustrated in FIGS. 1 and 2 a quench press 10 for quenching of at least one workpiece W, such as one or more steel rings. The press 10 is in an open position and generally may include a press bed 12, a press frame 14 positioned vertically above the press bed 12, a press ram 16 carried by the press frame 14 to move a portion of the press frame 14, and a press housing 18 carried on the press bed 12 to at least partially enclose the frame 14. Also, a quenching ring apparatus 20 may be carried by the press frame 14 to supply quenching fluid to the workpiece W, a drip guard apparatus 22 may be carried by the press bed 12 and/or housing 18 to prevent quench oil from dripping on red hot workpieces, and quench dies 24 may be carried by the press frame 14 to support the workpiece W.

The press bed 12 may be any suitable construction to position the press frame 14, preferably above floor-level. The press bed 12 may be a steel weldment, cast iron base, a portion of a quench oil tank, or any other suitable machine base. The press bed 12 may be composed of, and constructed in accordance with, any suitable materials and techniques known to those of ordinary skill in the art.

The press frame 14 generally may include a lower platen 26 for securing the press frame 14 to the press bed 12, and an upper platen 28 disposed above the lower platen 26. A plurality of guide posts 30 may be disposed between the platens 26, 28, and an intermediate platen 32 may be disposed between the platens 26, 28 and movably carried along the guide posts 30 such as via recirculating ball bushings 34 to movably carry the quenching ring apparatus 20 and one of the dies 24. The press frame 14 may be composed of, and constructed in accordance with, any suitable materials such as steel and techniques known to those of ordinary skill in the art.

The press ram 16 may include any suitable devices to move the movable intermediate platen 32 with suitable force to control the position of the intermediate platen 32 to forcibly clamp a steel ring between the dies 24. The press ram 16 also may be used to monitor and control the position of, and force applied to, the intermediate platen 32 to hold the steel ring within predetermined desirable limits of force. More specifically, the press ram 16 may be used to maintain a substantially uniform amount of force applied to the steel ring during quenching.

For example, and referring to FIG. 2, the press ram 16 may include a ram head 36 carried by the upper platen 28, a prime mover 38 that may be carried by the press housing 18, and a drivetrain 40 operatively coupled between the prime mover 38 and the ram head 36. The drivetrain 40 may include any suitable device(s) to transmit torque, such as gears, belts and pulleys, chains and sprockets, or the like (not separately shown). The prime mover 38 may include any suitable device (s) to generate torque such as a hydraulic motor, an electric stepper or servo motor, or the like. The ram head 36 may include any suitable force transmitting device such as a hydraulic cylinder, a ball screw device, or the like. In a specific example, the press ram 16 may include a programmable motion controlled ball screw drive or press available from PROMESS of Brighton, Mich.

Figure 3:
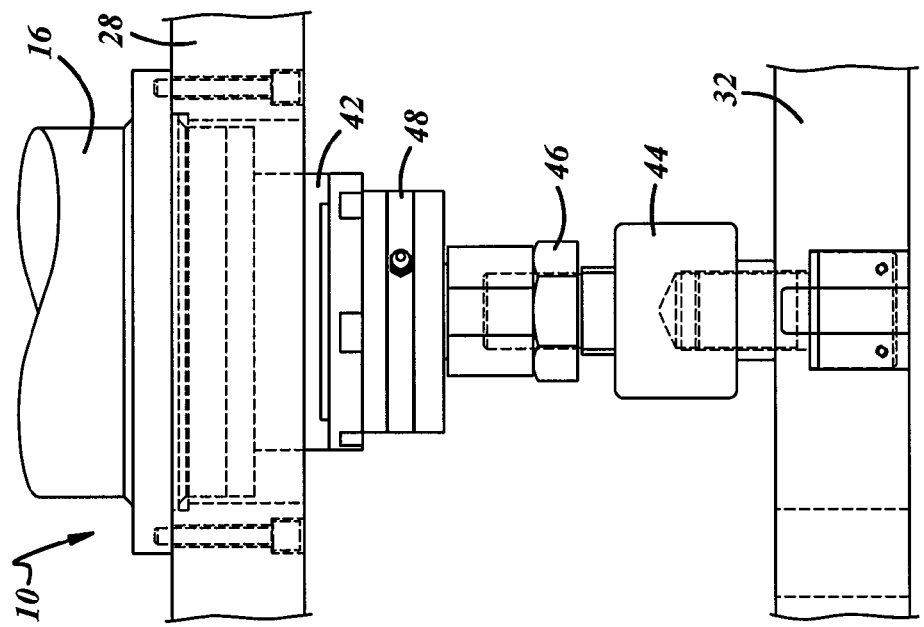
FIG. 3 is an enlarged fragmentary view of a portion of the quenching press of FIG. 1, illustrating a press ram coupling.

Referring to FIG. 3, any suitable coupling arrangement may be provided between the ram head 36 and the upper platen 28 and the intermediate platen 32 such as that shown in FIG. 3. The ram head 36 may be bolted to the upper platen 28 as shown, and may include a ram rod 42 that may be coupled to an intermediate platen connector 44 of any suitable type and in any suitable manner such as by a threaded stud and jam nut 46. A separate or external load cell 48 may be interposed between the jam nut 46 and the ram rod 42 in any suitable fashion. The external load cell 48 may be specified for a relatively low or first predetermined range of force monitoring, for example, from about 0 to 24,000 lbs or, more specifically from about 500 to 16,000 lbs. Any suitable type of load cell may be used, for example, a custom load cell model number 50059B2100 available from PROMESS.

Referring again to FIGS. 1 and 2, the press 10 or any portion thereof generally may be in communication with and controlled by a controller 50 that may include one or more of a processor 52, memory 54, and input/output (I/O) interfaces 56, suitable software that may be stored in the memory 54, and the like. The controller 50 may be any suitable machine control apparatus such as a programmable logic controller (PLC), personal computer (PC), or the like. The controller 50 may also include or may be interfaced with a press ram controller 51, which may include its own processor, memory, I/O interfaces, software, and the like (not separately shown). The controller 51 may include any suitable machine control apparatus, for example, a multi-axis controller available from PROMESS.

In one example, the press ram 16 may be monitored and controlled by the controller 51. The press ram 16 may include integrated sensors (not separately shown) and/or may be adapted for use with external sensors for closed loop feedback of press position and/or force. For example, the press ram 16 may include an integrated force transducer or load cell 58 in addition to the external load cell 48, and one or more ram head position sensors 60.

The integrated load cell 58 may be used to sense clamping force at a relatively high or second predetermined range, for example from about 16,000-48,000 lbs, in contrast to the relatively low or first predetermined range covered by the external load cell 48. These force ranges are merely exemplary and the load cells 48, 58 may cover any desired ranges of force. Preferably, the external load cell 48 is suited to provide good or fine resolution of press force over the relatively low range, whereas the integrated load cell 58 is suited to provide good or fine resolution of press force over the relatively high range. Accordingly, the dual load cell configuration provides a wide range of accurate clamping force sensing to enable the press 10 to die quench workpieces of a wide range of sizes and corresponding clamping forces. Also, the press ram 16 may receive inputs from the external load cell 48 and/or various other external press position sensors 62, 64, which may be used to sense position of the intermediate plate 32 and upper die 108 and/or to sense position of a portion of the quenching ring apparatus 20 as described below.

Figure 4:
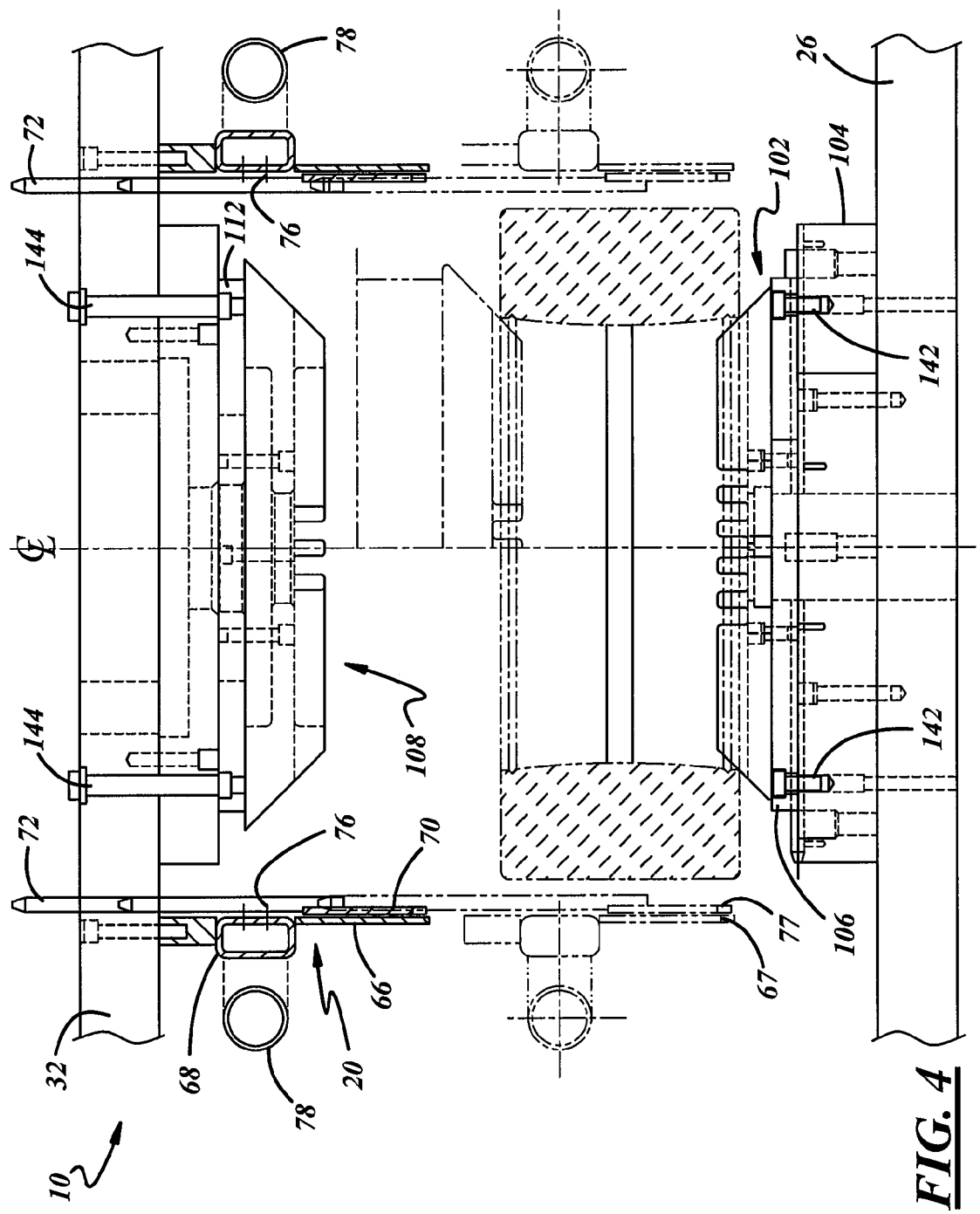
FIG. 4 is an enlarged fragmentary view of another portion of the quenching press of FIG. 1, illustrating an operating envelope between a movable platen and a lower platen including a quenching ring apparatus, dies, mounting plates, and risers.
Figure 5:
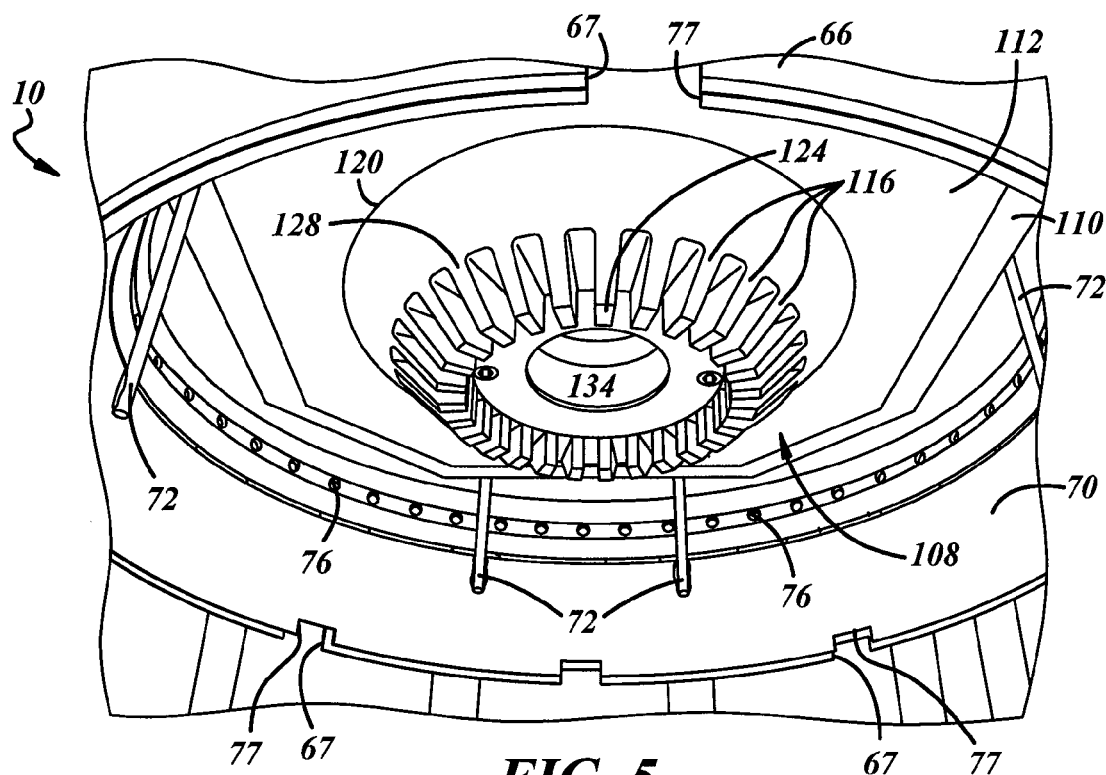
FIG. 5 is a fragmentary perspective view of a portion of the quenching press of FIG. 1, illustrating an interior of the quenching ring apparatus including the upper die.
Figure 6:
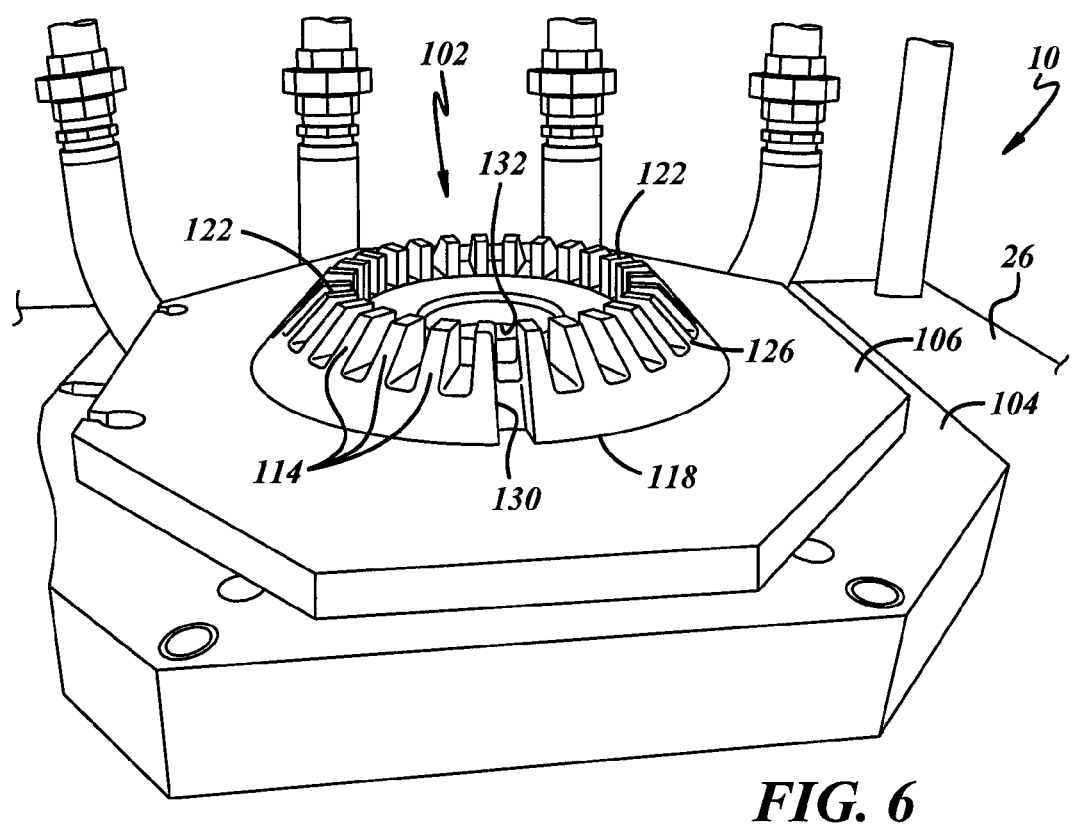
FIG. 6 is a fragmentary perspective view of a portion of the quenching press of FIG. 1, illustrating the lower die, mounting plate, riser, and platen.

Referring to FIG. 4, the quenching ring apparatus 20 may include a fixed outer shroud 66 carried by the intermediate platen 32, a quenching ring 68 carried by the outer shroud 66, and a movable inner shroud 70 carried by the intermediate platen 32 by guide rods 72. As shown in FIG. 2, the movable inner shroud 70 may be actuated by actuators 74 that may be carried by the intermediate platen 32 in any suitable fashion and that may be coupled to the guide rods 72 (FIG. 4). The actuators 74 may be any suitable devices such as pneumatic or hydraulic cylinders. As shown in FIGS. 2 and 4, the quenching ring 68 includes a plurality of ports 76 adapted to circumscribe the steel ring during quenching and one or more inlet lines 78 adapted to receive quenching fluid from an external source. Those skilled in the art will recognize that the quenching fluid may be delivered from a quench tank, via any suitable pumps, valves, and conduit (none shown).

Referring again to FIG. 1, the drip guard apparatus 22 may include a drip guard 80, and an actuator 82 to move the drip guard 80 to a position outside of the operational envelope of the press frame 14 to a position between the lower platen 26 and the quenching ring apparatus 20 in its raised position to prevent quenching oil from dripping onto a red hot workpiece. The drip guard 80 may be a rigid metal sheet such as a steel or aluminum tray that may be guided between any suitable guides (not shown) carried by the press 10. The actuator 82 may be any suitable device such as a hydraulic or pneumatic cylinder, ball screw, or the like, and may be suitably supplied with pressurized oil or air, or electricity, and may be suitably controlled by the controller 50. The controller 50 may operate the drip guard apparatus 22 to advance the drip guard 80 just after a workpiece W has been quenched and the quenching ring apparatus 20 raised, and before the finished workpiece is unloaded from, and a new workpiece loaded to, the press 10.

Quenching Dies

Referring now to FIGS. 5 through 10, the dies 24 may include a first or lower die 102 that may be carried by the lower platen 26 via a first or lower riser 104 and a first or lower mounting plate 106, and a second or upper die 108 that may be carried by the upper platen 28 (FIG. 1) via a second or upper riser 110 and a second or upper mounting plate 112. The dies 102, 108 may be a corresponding set including similar corresponding features. For example, the dies 102, 108 may be generally frusto-conical in side profile, and may include corresponding teeth 114, 116 and spaces therebetween.

Also, referring to FIGS. 7 through 10, the dies 102, 108 may include mounting ends 118, 120 (FIGS. 8 and 10), free ends 122, 124 substantially opposite the mounting ends 118, 120, and tapered sides 126, 128 disposed between the mounting and free ends 118, 120 and 122, 124. The first die 102 may also include one or more slots 130 in at least a portion of the free end 122, tapered side 126, and mounting end 118 of the first die 102 for good fluid flow over and through the die 102. As shown, three equidistantly spaced slots 130 may be used. The dies 102, 108 may also include through passages 132, 134 that may be provided with keyways for alignment of the dies 102, 108 when being installed in the press, or when being handled outside of the press. The dies 102, 108 may further include counterbores 136, 138 in the free ends 118, 120 for good fluid flow over and through the dies 102, 108. The lower die 102 may also include a lifting tool counterbore 140 (FIG. 8) in the mounting end 118 as will be described in greater detail below.

Figure 11:
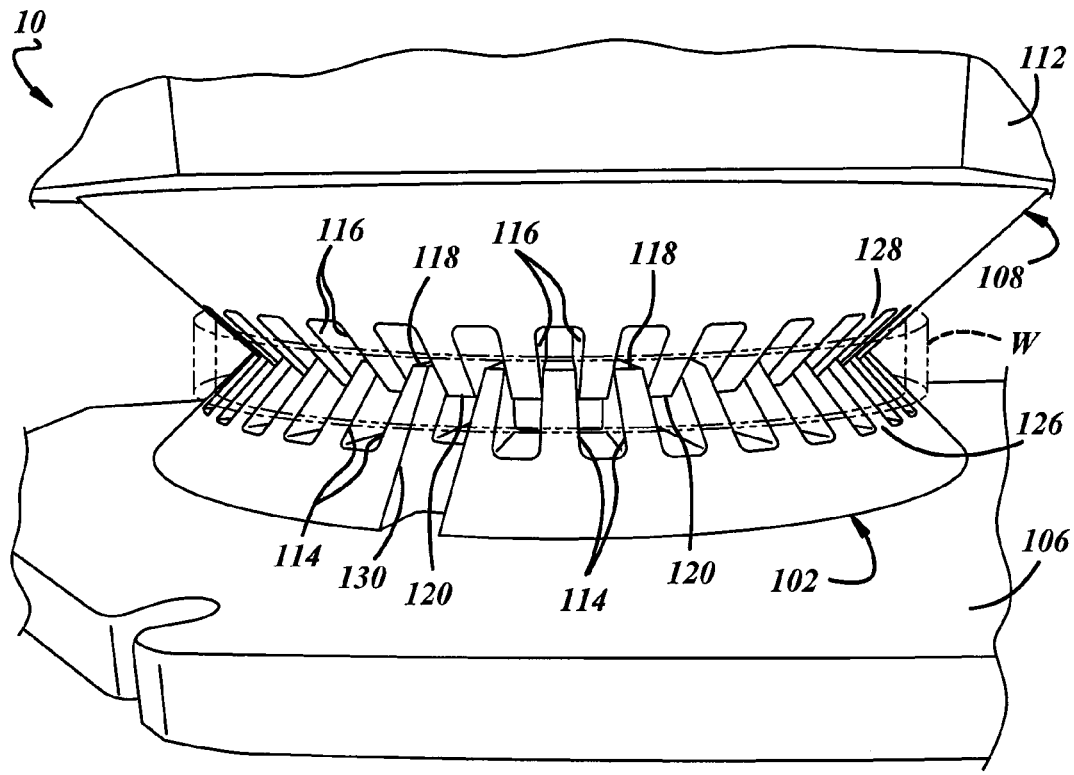
FIG. 11 is a fragmentary perspective view of a portion of the quenching press of FIG. 1, illustrating the upper die moved into an interdigitated relationship with the lower die.
Figure 12:
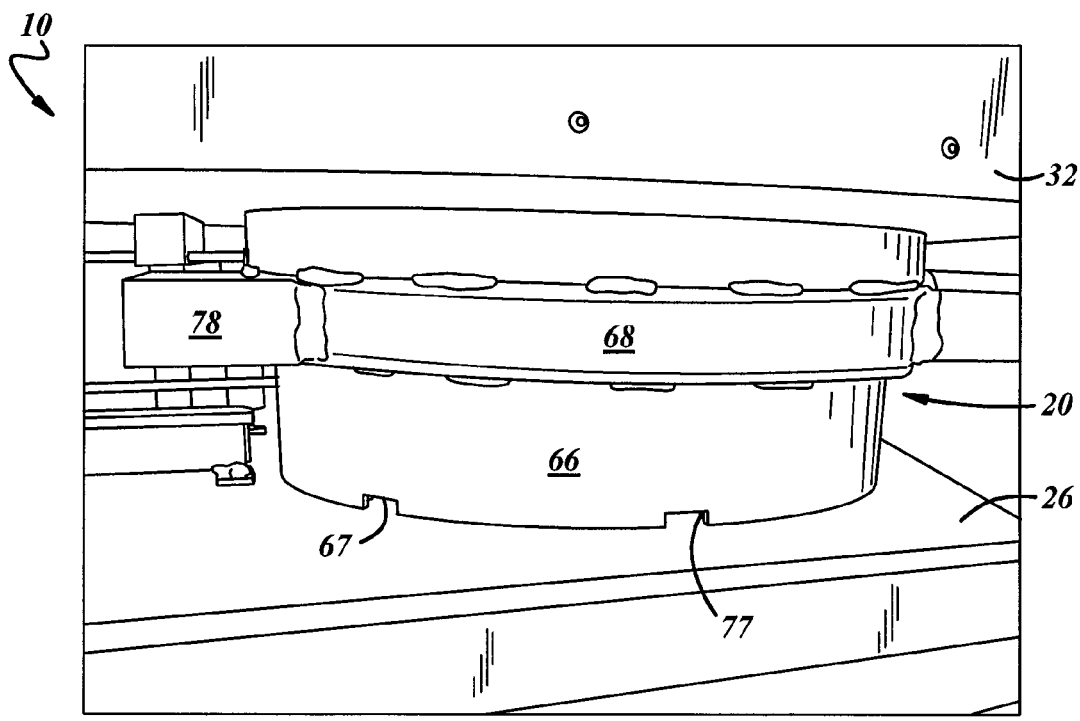
FIG. 12 is a fragmentary perspective view of a portion of the quenching press of FIG. 1, illustrating the quenching ring apparatus lowered into contact with the lower platen.

Referring to FIG. 11, the teeth 114, 116 may be provided in corresponding number, size, and spacing such that the teeth 144, 116 may be interdigitated with one another when the dies 102, 108 are placed one atop the other such as during storage of operation of the press 10. The teeth 114, 116 may be provided in at least portions of the free ends 122, 124 and tapered sides 126,128. The teeth 114, 116 may provide several functions including good fluid flow over and through the dies 102, 108, fixturing a workpiece with a minimum of heat transfer from the workpiece to the dies to reduce distortion during quenching, and an ability to overlap the free ends 122, 124 of the dies 102, 108 by interdigitating the teeth 114, 116. The latter ability will permit a wider range of heights of workpieces to be used with a given set of dies and stroke of the press, as illustrated by the contrast between FIGS. 4 and 11

Press Operation

In operation, the intermediate platen 32 is retracted initially to the position shown in FIG. 1 so that the upper die 108 and quenching ring apparatus 20 are also retracted, thereby enabling a workpiece handler (not shown) to place the workpiece W, such as a recently heat treated red hot steel ring, onto the tapered side 126 of the lower die 102 to be quenched. After the loader disengages the workpiece W and is retracted from the press 10, a press door (not shown) may be closed and the drip guard 80 retracted. Then, the press ram 16 may be actuated to extend its ram rod 42 downwardly until the tapered side 128 of the upper die 108 contacts the workpiece W to center the workpiece W on the lower die 102 so that the workpiece W generally may be concentric with, and clamped between, the lower and upper dies 102, 108. The clamping force applied to the steel ring may be monitored by one or both of the load cells 48, 58. The press ram 16 continues to be actuated to advance the ram rod 42 and upper die 108 until the workpiece W is firmly clamped to apply a substantially uniform press clamping force between both dies 102, 108, to fixture the workpiece W for quenching. When clamped, the tapered sides 126, 128 of the lower and upper dies 102, 108 engage generally radially inner surfaces of the workpiece W to radially and axially constrain the workpiece W to limit distortion of the workpiece W during quenching.

The applied press clamping force may be maintained at a substantially uniform value, for example, by using the controller(s) 50, 51 to monitor signals received from one or both of the load cells 48, 58, compare those signals to a target substantially uniform value, and adjust output signals to the press ram 16 to achieve the target substantially uniform value. The substantially uniform press clamping force value may be predetermined for particular design intent parameters of workpiece size, shape, material, quench cycle, and the like. Thus, it is contemplated that the predetermined substantially uniform press force will vary in response to at least one of the design intent parameters of workpiece size, shape, material, or quench cycle. Previous quenching press approaches involve moving a ram rod to an initial position to apply an initial press force to a workpiece upon initial engagement therewith and then maintaining that initial position. In contrast, the method and press disclosed herein involves adjusting the press ram 16 using closed loop control at least during quenching to adjust the position of the ram rod 42 and/or press clamping force applied to the workpiece W during quenching.

During clamping, and referring to FIG. 2, the shroud actuators 74 may be actuated to advance the inner shroud 70 relative to the outer shroud 66. This enables a lower edge of at least one of the shrouds 66, 70 to maintain contact with the lower platen 26 during quenching regardless of the size of the workpiece W. For example, if a maximum height workpiece is being quenched, then the inner shroud 70 would be advanced relatively greatly relative to the outer shroud 66. In contrast, if a minimum height workpiece is being quenched, then the inner shroud 70 would be advanced relatively little or not at all relative to the outer shroud 66. The shroud position sensors 64 may be used to indicate relative movement between the shrouds 66, 70. The inner shroud 70 may be initially fully advanced so that when the movable platen 32 is advanced the inner shroud 70 contacts the lower platen 26 and the shroud actuators 74 give to maintain contact of the inner shroud 70 with the lower platen 26. In another example, the movable platen 32 may be advanced to a desired position, and then the inner shroud 70 may be advanced to make contact with the lower platen 26. In any case, the shroud position sensors 64 may be used to indicate whether the inner shroud 70 is in a home position, and advanced position, or anywhere therebetween.

Once the workpiece W is clamped according to the predetermined substantially uniform press force, quenching fluid may be rapidly directed into the interior of the quenching ring apparatus 20 in any suitable manner and over and through the dies 102, 108 to uniformly quench the workpiece W. As quenching fluid is introduced into the quenching ring apparatus 20, quenching fluid may simultaneously drain out of outlets 67, 77 in one or both of the shrouds 66, 70 and into a fluid return or sump basin (not shown) of the press 10 to enable a relatively large volume of turbulent quenching fluid to pass through the quenching ring apparatus 20 and over and through the dies 102, 108 to rapidly quench the workpiece W. During quenching, the press ram 16 may be readjusted in response to the sensed clamping force to maintain a substantially uniform clamping force on the workpiece. For example, the prime mover 38 may be controlled by the controller(s) 50, 51 to apply more or less power to the ram head 36 to apply more or less clamping force on the workpiece W depending on how the particular workpiece is contracting radially, axially, and/or circumferentially. For example, the diameter of some workpieces may contract more significantly than the height, thereby warranting a decrease in power applied to the ram head 36 to maintain the substantially uniform clamping force. In another example, the height of some workpieces may contract more significantly than the diameter, thereby warranting an increase in power applied to the ram head 36 to maintain the substantially uniform clamping force. In either case, the press ram 16 can be readjusted to maintain the substantially uniform clamping force on the workpiece. If desired for some workpiece designs and quenching cycles, the clamping force may be intentionally varied during the quenching cycle according to any suitable predetermined desired function of force vs. time. For example, the force may be increased or decreased over time according to any formula, equation, look up table, map, model, or the like.

Thereafter, quenching fluid supply may be cut off and the remaining quenching fluid in the quenching ring apparatus 20 may drain out of the outlets 67, 77 and into the fluid return or sump basin. At this time or slightly thereafter, the press ram 16 may be actuated to retract the ram rod 42 and thereby lift the upper die 108 away from the lower die 102 to unclamp the workpiece W. As the upper die 108 is retracted, the quenching ring apparatus 20 is also retracted and compressed air may be discharged through the quenching ring apparatus 20 onto the upper die 108 to remove quenching fluid from the die 108 to prepare it for engaging the next heated workpiece. About the time the upper die 108 reaches its fully retracted position, the workpiece W handler may remove the workpiece W from the press 10 and place it on a conveyor (not shown) to be transported away from the press 10 to a downstream operations such as tempering or grinding operations. Also at about this time or somewhat thereafter, the drip guard actuator 82 of the drip guard apparatus 22 may be actuated to advance the drip guard 80 into the press frame 14 underneath the retracted quenching ring apparatus 20 to prevent quenching fluid from dripping off the upper die 108, quenching ring apparatus 20, and the like onto a new red hot workpiece being introduced into the press 10 by the workpiece W handler. Once the drip guard 80 is advanced, a hot workpiece may be loaded onto the lower die 102 by the workpiece W handler and thereafter another quenching cycle is initiated.

This method of quenching hot annular workpieces so significantly reduces distortion that for a typical bearing race, after hardening, substantially less material need be removed to provide concentric peripheral surfaces. Consequently, the radial thickness of the machined ring before hardening can usually be reduced about 0.020 to 0.040 of an inch or more. This results in significant savings in material, labor, machining and finish grinding. Also, the unique interdigitating relationship between the dies 102, 108, and the relatively adjustable shrouds 66, 70 enables use of a wider range of workpiece diameters and heights than ever before possible with a single set of dies. Nonetheless, workpiece size may vary from one production run to another to such a degree that it may become necessary to use larger or smaller dies for a given workpiece or production run of differently sized workpieces within a given size range.

Die Changes

To facilitate such production changes from a die set of one size to a die set of another size and reduce labor in doing so, a pair of dies may be loaded into and out of the press together as an interdigitated set. For example, and referring to FIG. 4, cap screws 142 may be removed from the lower mounting plate 106 to release the lower mounting plate 106 and lower die 102 from the lower riser 104 and lower platen 26. Then, the press 10 may be cycled to advance the upper die 108 toward and onto the lower die 102 such that the two dies 102, 108 are interdigitated. Thereafter, cap screws 144 may be removed from the intermediate platen 32 to allow the release the upper mounting plate 112 from the intermediate platen 32. Then, the intermediate platen 32 may be retracted such that the connected upper mounting plate 112 and die 108 may rest freely on the connected lower die 102 and mounting plate 106, which in turn rest freely on the lower riser 104.

Subsequently, and referring to FIG. 13, the dies 102, 108 and mounting plates 106, 112 may be unloaded out of the press 10 as described below. First, the press 10 may include a guide apparatus 84 that may include a guide plate 86 mounted on risers 88 and having bearing rails 90 and a guide rail 92, and bridging rails 94. A die handling apparatus 200 may be used to unload the dies 102, 108 from the lower riser 104, over the guide apparatus 84, and out of the press 10.

Figure 14:
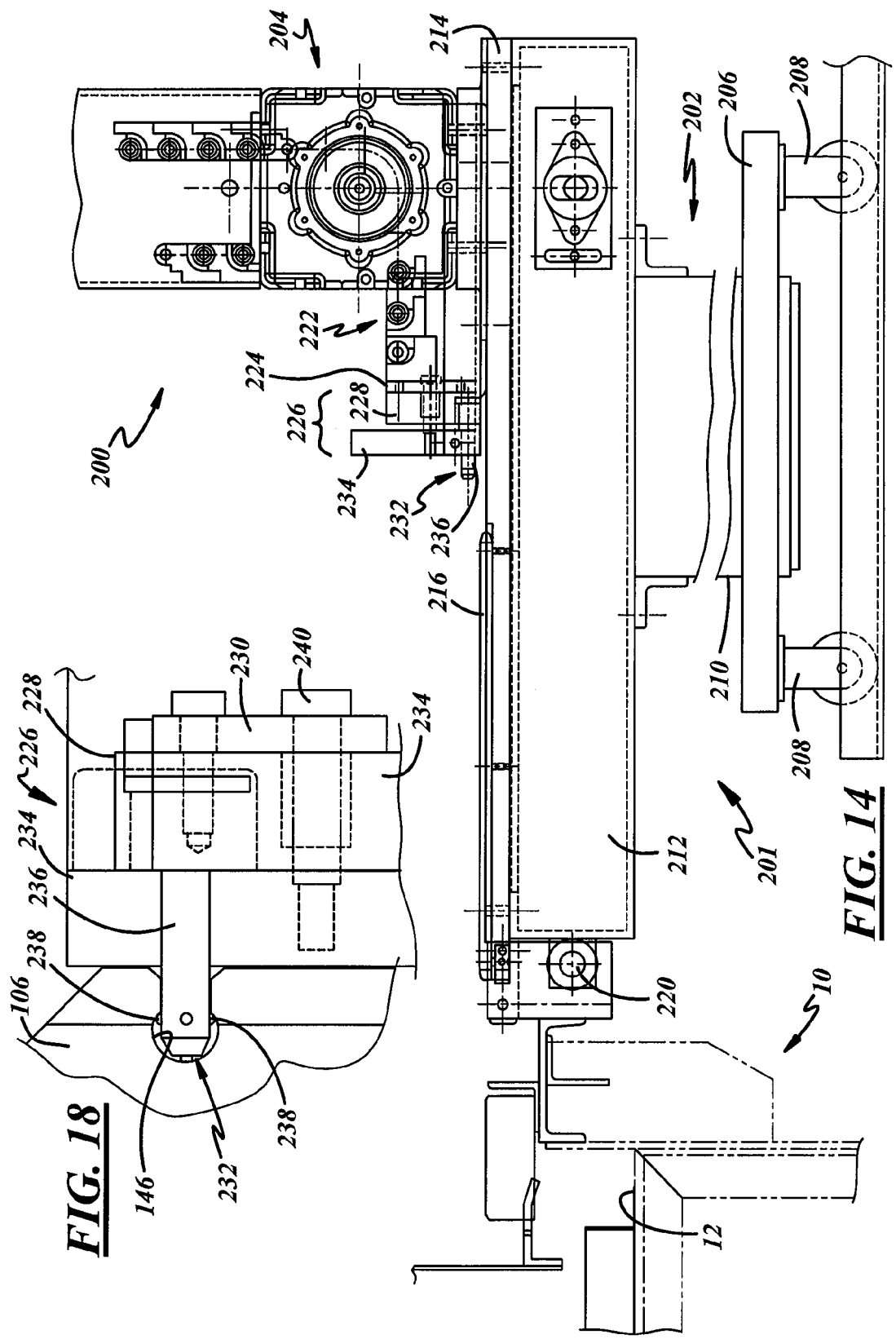
FIG. 14 is a fragmentary side view of a portion of the quenching press of FIG. 1 and the die handling apparatus of FIG. 13.

Referring to FIG. 14, the die handling apparatus 200 may include a cart 202, and a drive mechanism 204 carried on the cart 202. The cart 202 may be composed of any suitable materials and constructed in any suitable fashion. For example, the cart 202 may be a weldment of angle iron and steel plates, and may include a base 206 that may carry wheels 208, an upright 210 carried on the base 206, and a table 212 carried on the upright 210. The table 212 may carry a mounting plate 214 that supports the drive mechanism 204 and that carries a guide rail 216 in any suitable fashion.

Figure 15:
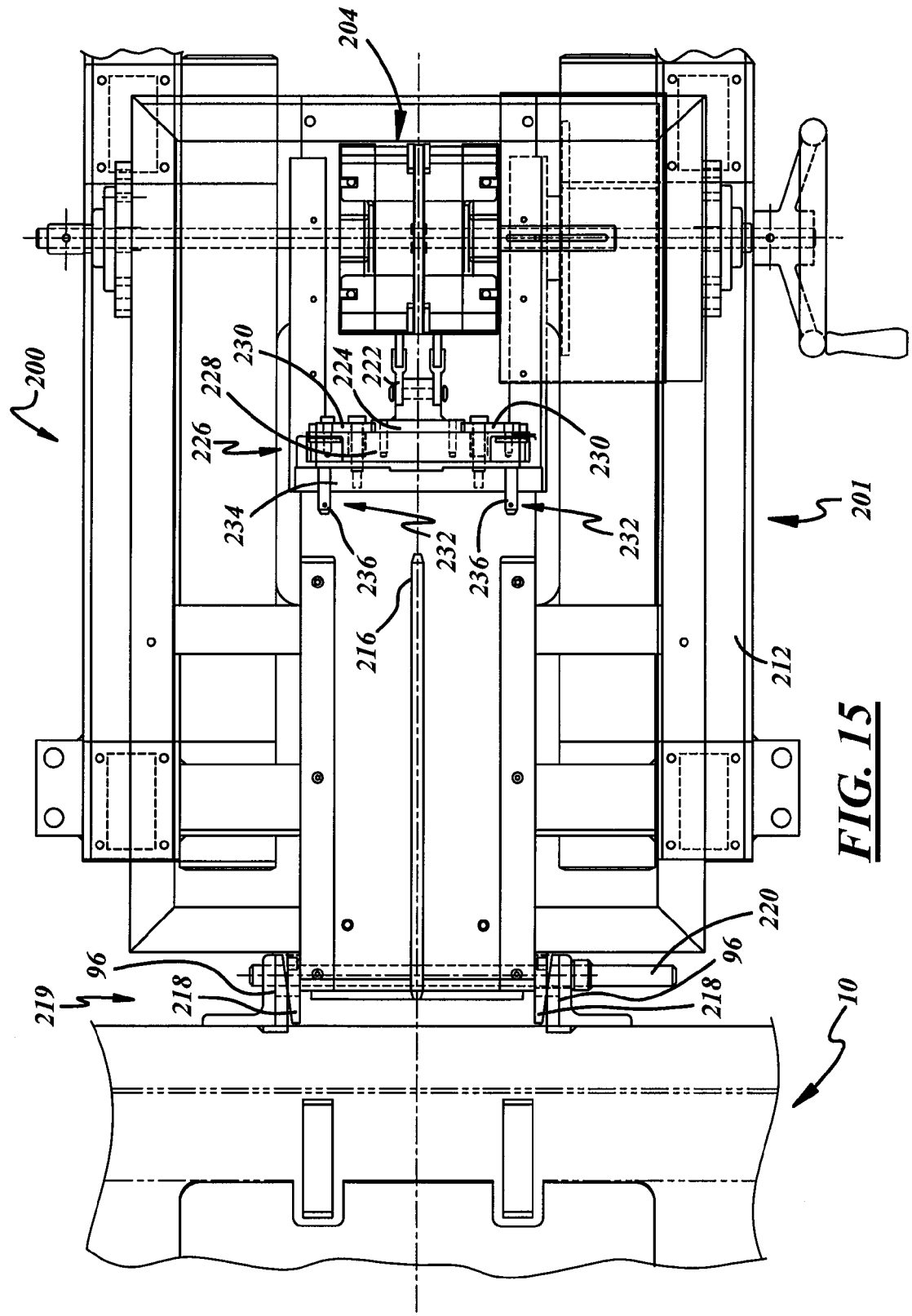
FIG. 15 is a fragmentary top view of a portion of the quenching press and the die handling apparatus of FIG. 13.
Figure 17:
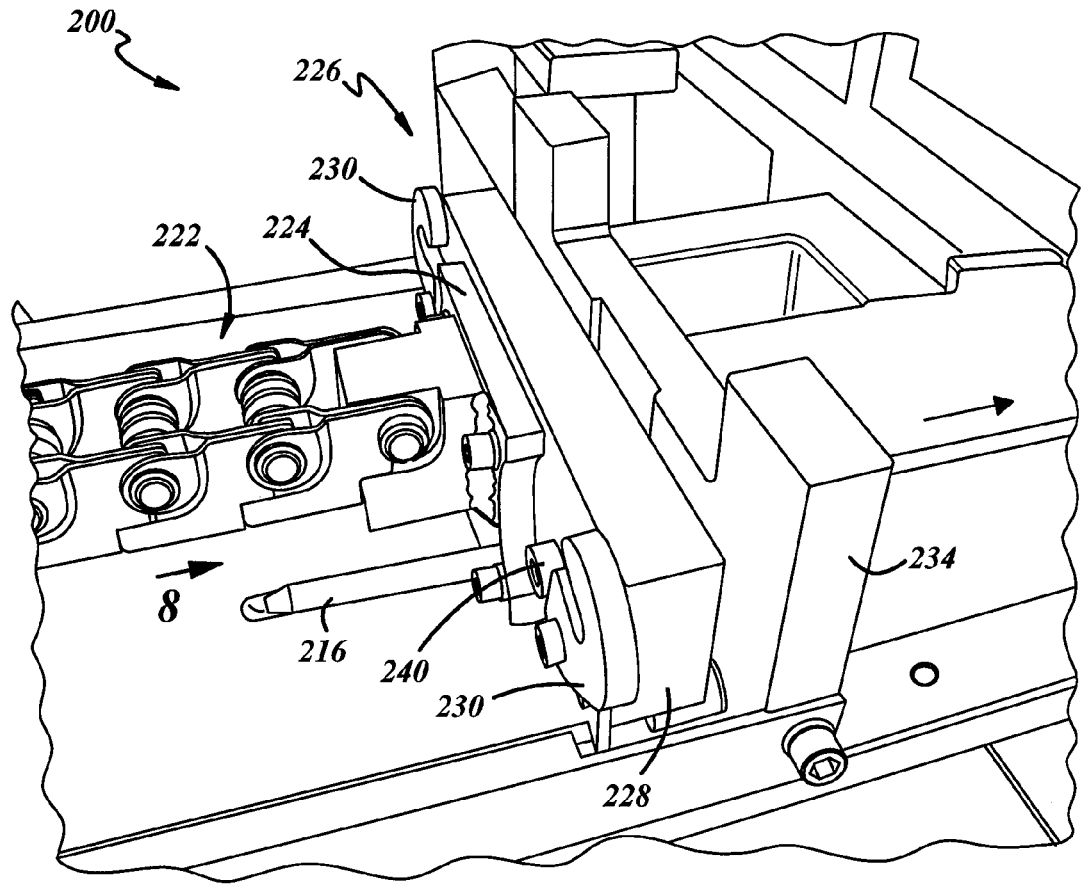
FIG. 17 is a fragmentary rear perspective view of a portion of the die handling apparatus of FIG. 13, illustrating the push-pull chain and a rear of the end effector.
Figure 19:
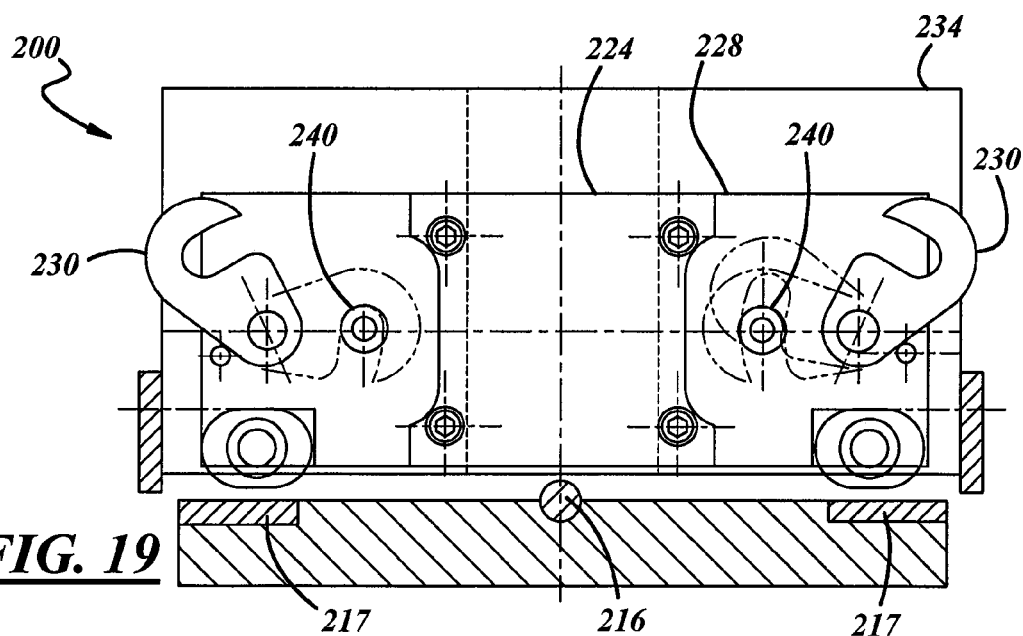
FIG. 19 is a rear view of the end effector of the die handling apparatus of FIG. 13.

As shown in FIG. 15, a coupling apparatus 219 may be provided to couple the die handling apparatus 200 to the press 10. The coupling apparatus 219 may include coupling flanges 218 carried by the table 212 in any suitable manner at a forward end of the apparatus 200, and may also include corresponding coupling flanges 96 carried by the press 10. The coupling apparatus 219 may further include a coupler 220 such as a coupling shaft or the like that extends through corresponding apertures in the flanges 96, 218.

Referring to FIGS. 14 and 15, the drive mechanism 204 may be any suitable device to push and pull the dies, such as a push-pull chain device available from SERAPID of Sterling Heights, Mich. For example, a SERAPID model 40 PSR 2000 rigid chain device may be used. The drive mechanism 204 may include a chain 222 and a mounting plate 224 fixed to the end of the chain 222 in any suitable manner. The drive mechanism 204 may be electrically, hydraulically, or manually operated to advance and retract an end effector 226 mounted to the mounting plate 224.

Referring to FIGS. 13 through 17, the end effector 226 may be used to grasp the lower mounting plate 106 (FIG. 13) to advance and retract the set of dies 102, 108 into and out of the press 10. The end effector 226 may include a base plate 228 that is affixed to the mounting plate 224 and that carries latches 230, lock pins 232, and a lock pin actuating plate 234 movably carried on the shanks 236 of the lock pins 232 to actuate the lock pins 232 when the base plate 228 is advanced against the actuating plate 234. The lock pins 232 may include shanks 236, pistons (not shown) carried in the shanks 236, and one or more balls 238 (FIG. 16) retained in the shanks 236 and radially actuated into and out of grooves (not shown) of the pistons to retract and expand or extend relative to the shanks 236. The lock pins 232 may be any suitable lock pin devices such as single acting ball lock pins, model CL-8-BLPB-1.50 available from Carr-Lane of St. Louis, Mo.

When the dies 102, 108 are resting in the press 10 and ready to be extracted, the die handling apparatus 200 may be wheeled up next to the press 10 so that the apparatus 200 may be coupled thereto using the coupling shaft 220 inserted through the flanges 96, 218. Then, the drive mechanism 204 may be actuated to advance the end effector 226 off the table 212, over the corresponding guide apparatus 84 of the press 10, and adjacent to the lower mounting plate 106.

Figure 13:
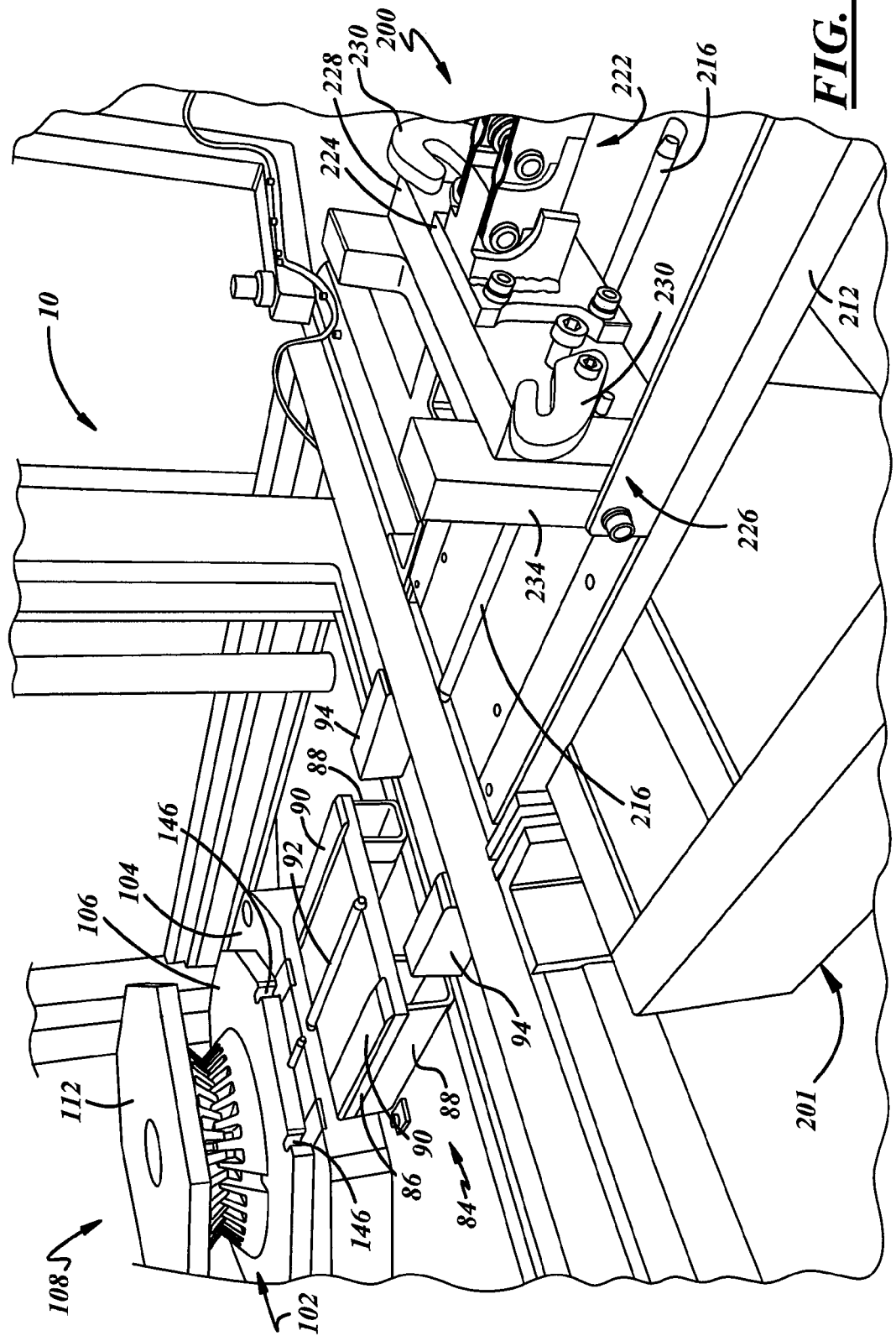
FIG. 13 is a fragmentary perspective view of a portion of the quenching press of FIG. 1 and a portion of a die handling apparatus.

Referring to FIGS. 13 and 18, the end effector 226 may be advanced so that the lock pins 232 enter, or bottom out within, semi-circular slots 146 in a side of the lower mounting plate 106 and the actuating plate 234 rests against the side of the lower mounting plate 106. The end effector 226 may be constructed and arranged so that the lock balls 238 are normally retracted when the end effector 226 is not advanced against the lower mounting plate 106, such as when the end effector 226 is being advanced to approach the dies 102, 108 awaiting retrieval in the press 10. The lock pins 232 may be actuated by advancing the end effector 226 into contact with the lower mounting plate 106 with the lock pins 232 in the slots 146 such that the base plate 228 advances against the actuating plate 234. Accordingly, portions of the actuating plate 234 engage corresponding portions of the lock pins 232 to advance or retract the lock pin piston (not shown) to advance the lock balls 238 into engagement with the lower mounting plate 106 within the slots 146, as shown in FIG. 18. At this point, the latches 230 may be rotated into engagement between the base plate 238 and heads of posts or cap screws 240 coupled or threaded into the actuating plate 234. The latches 230 hold the base plate 228 and the actuating plate 234 tightly together to maintain actuation of the lock pins 232 and concomitant engagement of the lock pins 232 to the lower mounting plate 106. Thereafter, the drive mechanism 204 may be activated to retract the chain 222 and end effector 226, whereby the actuated lock balls 238 grip the lower mounting plate 106, which then may be retracted. Once retracted off the riser 104, over the guide apparatus 84, out of the press 10, and onto the table 212 of the die handling apparatus 200, the dies 102, 108 are now ready to be lifted off the table 212.

Those of ordinary skill in the art will also recognize that the lock pins 232 may instead be positive locking until released by pushing a button (not separately shown) on the pins 232, to move the piston forward to allow the locking balls to retract into the radial groove of the piston. Accordingly, in this embodiment, the locking plate would be adapted to advance against the base plate to actuate the pins to retract the locking balls to allow the locking pins 232 to enter and exit the corresponding slots in the mounting plate 106. Likewise, the locking plate would be adapted to be separated from the base plate to release the pins to advance the locking balls into engagement with the corresponding slots in the mounting plate 106.

Lifting Tool

Figure 20:
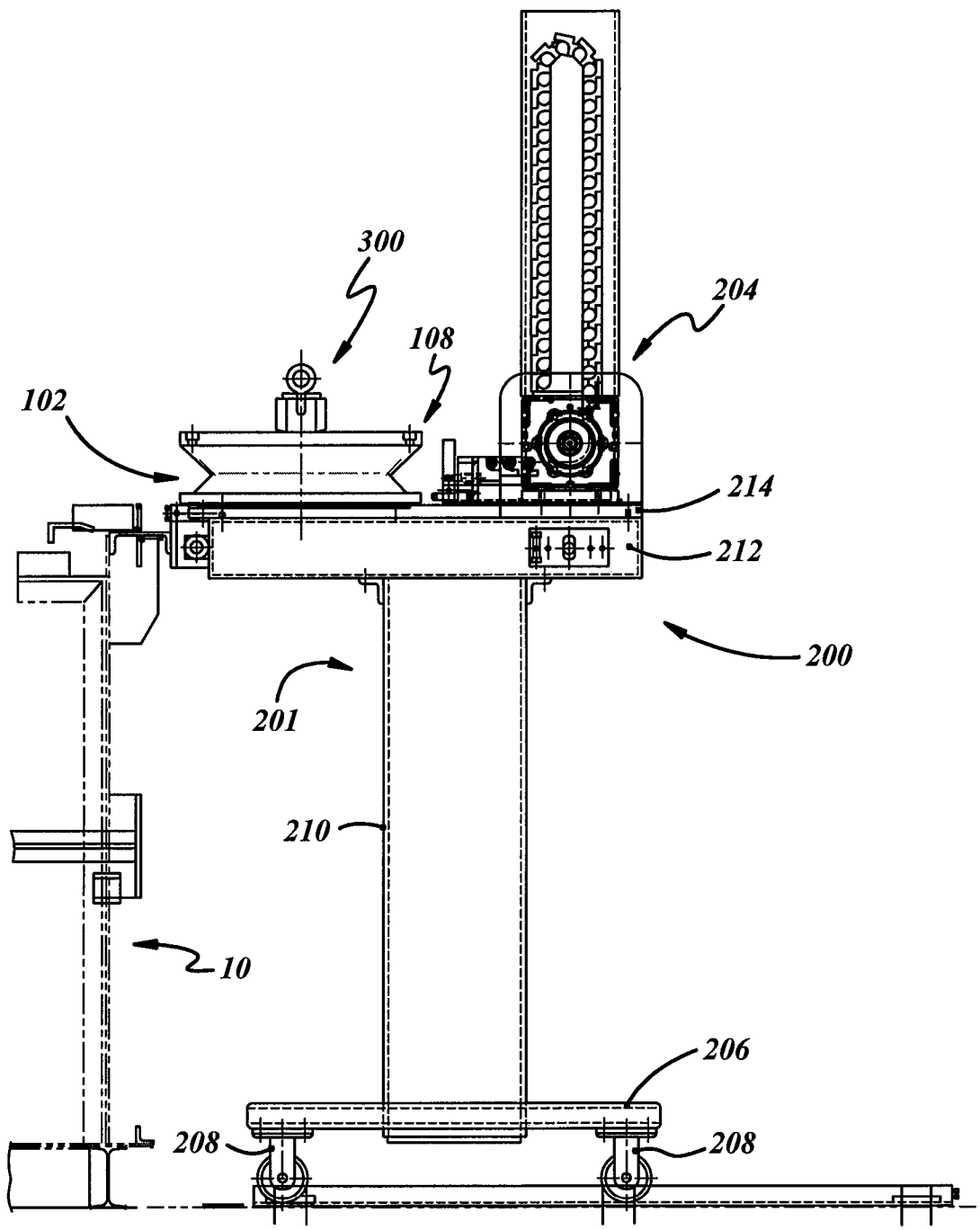
FIG. 20 is a fragmentary side view of a portion of the quenching press and the die handling apparatus of FIG. 13, illustrating the dies carried on the die handling apparatus and a die lifting tool coupled to the dies.
Figure 21:
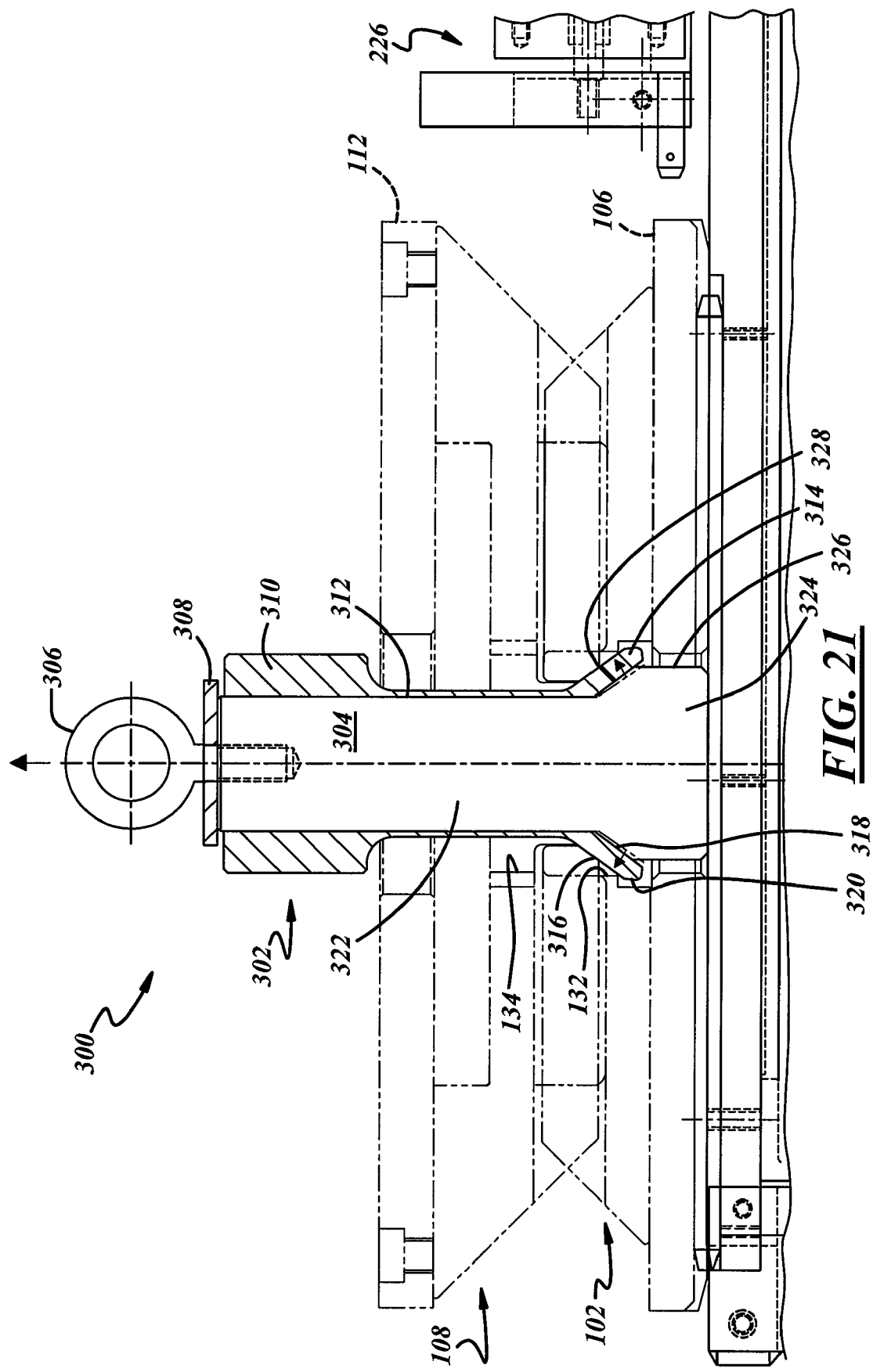
FIG. 21 is an enlarged fragmentary side view of the quenching press, die handling apparatus, dies, and die lifting tool shown in FIG. 20.

Referring now to FIG. 20, a special lifting tool 300 may be used to assist in holding the dies 102, 108 together, while an overhead crane (not shown) couples to the lifting tool 300 to lift the tool 300 and dies 102, 108 off the table 212 of the die handling apparatus 200. As better shown in FIG. 21, the lifting tool 300 may include collet 302, a mandrel 304 extending through the collet 302, a lifting eye 306 coupled to the mandrel 304, and a retainer plate 308 coupled between the lifting eye 306 and the mandrel 304 to limit relative motion between the mandrel 304 and collet 302. The collet 302 may include a handle 310, a shank 312 extending from the handle 310 and terminating in an outwardly tapered end 314. The tapered end 314 may have an outer tapered surface 316, an inner tapered surface 318, and an outer surface or diameter 320 therebetween. The mandrel 304 may include a shank 322 extending through the shank 312 of the collet 302 and terminating in an enlarged end 324. The enlarged end 324 may include an outer surface or diameter 326 and a tapered surface 328 between the outer diameter 326 and the shank 322 to cooperate with the inner tapered surface 318 of the collet 302.

The lifting tool 300 may be coupled to the dies 102, 108 as follows. The handle 310 of the collet 302 may be grasped such that the mandrel 304 drops relative to the collet 302 to the extent permitted by the retainer plate 308 to allow the tapered end 314 of the collet 302 to relax inwardly. In its relaxed state, the outer diameter 320 of the tapered end 314 is sized to be fit within the through passages 132, 134 of the dies 102, 108. At this point, an operator may continue to hold the handle 310 of the collet 302, attach the crane hook to the lifting eye 306, and activate the crane to lift the mandrel 304 relative to the collet 302.

This relative axial motion between the collet 302 and mandrel 304 outwardly flares the tapered end 314 of the collet 302 by virtue of the cooperating tapered surfaces 318, 328. Now, the tapered end 314 is flared outwardly into the counterbore 136 of the lower die 102 and is larger in diameter than the corresponding through passage 132 of the lower die 102. Accordingly, further lifting of the lifting tool 300 causes the collet 302 to more firmly engage the lower die 102 and thereby lift the lower die 102 and, concomitantly, lift the upper die 108.

The lifting tool 300 may be disengaged by allowing the set of dies 102, 108 to come to rest against a surface, and axially moving the mandrel 304 relative to the collet 302 such that the retainer plate 308 engages the collet 302. This allows the tapered end 314 to relax so that the lifting tool 300 may be withdrawn through the through passages 132, 134 of the dies 102, 108. Accordingly, the lifting tool 300 may reduce labor in changing quenching dies.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. A corresponding set of quenching dies for quenching steel rings, comprising:
   a first quenching die including a first plurality of spaced apart teeth with free ends and tapered sides collectively forming a first exterior frusto-conical surface engageable with a first inner edge of a steel ring; and
   a second quenching die including a second plurality of spaced apart teeth with free ends and tapered sides collectively forming a second frusto-conical surface engageable with a second inner edge of the steel ring generally opposed to the first inner edge of the steel ring; and
   the teeth being configured so that the first plurality of teeth can interdigitate with the second plurality of teeth when they overlap with the first conical surface engaging the first inner edge of the steel ring and the second conical surface engaging the second inner edge of the steel ring and being generally opposed to the first conical surface with the steel ring received between them.

2. The corresponding set of quenching dies of claim 1, wherein the dies include mounting ends, free ends substantially opposite the mounting ends, the tapered sides are disposed between the mounting and free ends, through passages between the mounting and free ends, and counterbores in the free ends.

3. The corresponding set of quenching dies of claim 2, wherein the first die includes at least one slot in at least a portion of its free end, tapered side, and mounting end.

4. The corresponding set of quenching dies of claim 3, wherein the at least one slot includes three slots equidistantly spaced about the first die.

5. The corresponding set of quenching dies of claim 1 wherein the first die includes a second counterbore in its mounting end.

6. A die handling tool to lift a corresponding set of quenching dies having a first generally frusto-conical quenching die including a first plurality of teeth, a mounting end and a counterbore in its mounting end, and a second generally frusto-conical quenching die including a second plurality of teeth interdigitable with the first plurality of teeth of the first generally frusto-conical quenching die, the tool comprising;
   a mandrel including a shank, a first end, an enlarged second end opposite the first end, and a tapered surface between the enlarged second end and the shank; and
   a collet carried on the mandrel and including a handle, a shank extending from the handle, and a tapered end extending from the shank and having an inner tapered surface corresponding to the tapered surface of the mandrel;
   wherein the mandrel is axially movable relative to the collet to outwardly flare the tapered end of the collet by virtue of the cooperating tapered surfaces of the collet and mandrel, so that the tapered end of the collet is adapted to grip the first die within its counterbore.

7. A die handling apparatus for use with a quenching press, comprising:
   a cart;
   a push-pull device carried on the cart; and
   an end effector advanced and retracted by the push-pull device and including:
      a base plate coupled to the push-pull device;
      lock pins carried by the base plate;
      a lock pin actuating plate movably carried on the lock pins and adapted to actuate the lock pins when the base plate is advanced against the lock pin actuating plate;
      posts including heads, and shafts coupled to the lock pin actuating plate and extending through the base plate; and
      latches movably carried by the base plate and adapted to be positioned between the base plate and the heads of the posts when the base plate is advanced against the lock pin actuating plate.

8. The die handling apparatus of claim 7, wherein the actuating plate may be advanced against the base plate to advance or retract locking balls of the locking pins.

9. The die handling apparatus of claim 7, wherein the lock pins include shanks and lock balls radially extendable to actuated positions with respect to the shanks when the lock pins are actuated.

10. The die handling apparatus of claim 7, wherein the cart includes:
   a table;
   a base;
   an upright positioned between the base and the table; and
   wheels carried by the base.

11. The die handling apparatus of claim 10, further comprising:
   a table;

a mounting plate carried on the table; and a guide rail carried on the mounting plate to guide the end effector.

12. The die handling apparatus of claim 7, wherein the cart is adapted to be coupled to the quenching press.

13. The die handling apparatus of claim 12, further comprising:

at least one flange adapted to be coupled to at least one flange of the die quenching press; and a coupler adapted to be inserted through the flanges of the table and die quenching press.

14. The die handling apparatus of claim 7, wherein the push-pull device is a push-pull chain device.

15. A die handling tool to lift a set of interdigitated quenching dies, comprising:

a mandrel including a shank, a first end, an enlarged second end opposite the first end, and a tapered surface between the enlarged second end and the shank; and a collet carried on the mandrel and including a handle, a shank extending from the handle, and a tapered end extending from the shank and having an inner tapered surface corresponding to the tapered surface of the mandrel;

wherein the mandrel is axially movable relative to the collet to outwardly flare the tapered end of the collet by virtue of the cooperating tapered surfaces of the collet and mandrel, so that the tapered end of the collet is adapted to grip the set of interdigitated quenching dies to lift the dies.

16. The die handling tool of claim 15, further comprising:

an eyebolt coupled to the first end of the mandrel and having a head; and a retainer plate coupled between the head of the eyebolt and the first end of the mandrel.

* * * * *